United States Patent [19]
Sumida

[11] 3,988,829
[45] Nov. 2, 1976

[54] NIBBLER

[75] Inventor: Kunio A. Sumida, Los Angeles, Calif.

[73] Assignees: Primex Equipment Company; Astropneumatics Tool Company, both of Los Angeles, Calif.

[22] Filed: Jan. 30, 1975

[21] Appl. No.: 545,421

[52] U.S. Cl. .................................... 30/241; 83/916
[51] Int. Cl.[2] ........................................ B26B 15/00
[58] Field of Search ................... 30/228, 241, 242; 83/613, 916

[56] References Cited
UNITED STATES PATENTS

| | | | |
|---|---|---|---|
| 2,535,631 | 12/1950 | Gray | 30/241 |
| 2,750,667 | 6/1956 | Johnson | 30/228 |
| 2,844,872 | 7/1958 | Yermish | 30/241 |
| 3,340,610 | 9/1967 | Hendrickson | 30/241 X |

*Primary Examiner*—Al Lawrence Smith
*Assistant Examiner*—J. C. Peters
*Attorney, Agent, or Firm*—Ellsworth R. Roston

[57] ABSTRACT

A portable housing encloses a source of power which provides rotational motion. Means for converting the rotational motion to a reciprocal motion supports a punch which is reciprocated with respect to the housing along a particular surface of a first die member. A second die member is adapted to be disposed over the punch to form a die channel with the particular surface and to provide a cutting surface against which the sheet metal can be cut by the punch. Stripper means is provided to extend on the opposite side of the sheet metal from the cutting surface to maintain the sheet metal in a substantially contiguous relationship with the cutting surface of the second die member.

13 Claims, 9 Drawing Figures

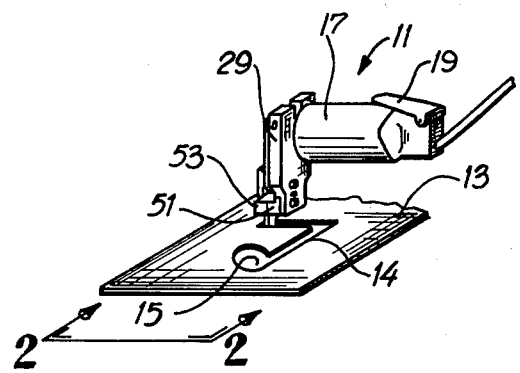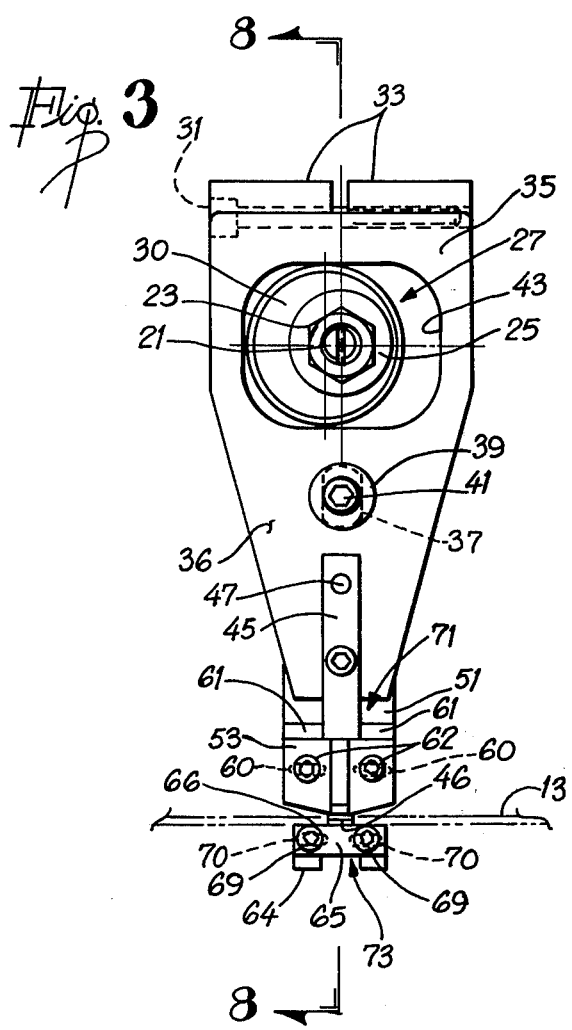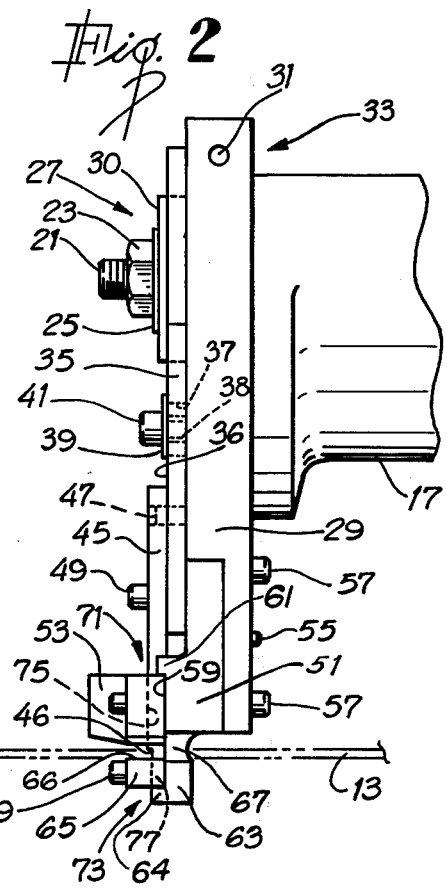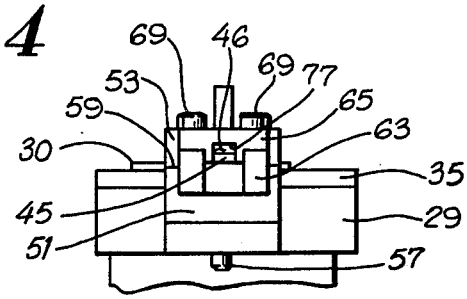

NIBBLER

BACKGROUND OF THE INVENTION

1. Field of the Invention

This invention relates generally to cutting apparatus and more specifically to nibblers adapted to cut sheet metal.

2. Description of the Prior Art

The nibblers of the prior art have included a source of power enclosed in a housing for reciprocating a punch relative to a die between a cutting stroke and a return stroke. Sheet metal moved relative to the punch and die has been nibbled away by action of the punch and die to cut the sheet metal. Means has also been provided on the side of the sheet metal opposite the die for stripping the sheet metal from the punch during the return stroke.

The dies in the prior art devices have been elaborate and complex, often formed from a single piece of material. These dies have been constructed for disposition in a single position relative to the punch. Thus, alignment of the punch and die has been a significant problem.

In some nibblers of the prior art, the die surface has been defined on the same side of the sheet metal as the housing. In such embodiments, the punch has been aligned with the die by guide members on both sides of the cutting surface. The guide members on the side of the cutting surface opposite the housing have been particularly large and therefore have required starting holes of significant size in order to make interior cuts. Large starting holes are undesirable where small internal cuts are to be made.

In other nibblers of the prior art, the cutting surface of the die has been defined on the side of the sheet metal opposite the source of power. These die assemblies have also been relatively large, therefore necessitating starting holes of significant size.

The portions connecting the guide members on opposite sides of the sheet metal must necessarily ride in the cut made by the punch. With this disposition, these connecting portions have a considerable effect on the sharpness of a corner which can be cut. In the past, these portions have been relatively large and often have been displaced from the punch so that the sharpness of corners has been quite limited.

It is often desirable to make square interior cuts in a piece of sheet metal. This generally requires a punch and associated die channel having a rectangular configuration. In the past, such die channels have been cut from a single piece of material by boring the material. This process is particularly expensive so that rectangular punches and dies have been provided only on very elaborate and expensive apparatus.

SUMMARY OF THE INVENTION

In accordance with the present invention, structural elements providing for the very simple alignment of the die and the punch are disposed around the punch either before or after the punch has been positioned. The punch moves within these elements so that alignment of the punch and the die is easily accomplished and continuously maintained. In one embodiment, a guide block and die are provided on the same side of the sheet metal workpiece as the source of power. The only element, other than the punch, which might extend beyond the sheet metal workpiece is a stripper. The stripper can be of minimal size so that the starting hole of an interior cut can be very small. The stripper may be connected to the tool by a narrow throat which extends through the cut in the sheet metal. The throat may have a contiguous relationship with the punch so that relatively sharp corners can be cut in the sheet metal. This nibbler can be easily and inexpensively provided with a punch guide channel having a rectangular cross section.

In another embodiment having a punch with a rectangular cross section, guide structure may be provided on the same side of the sheet metal as the source of power. This guide structure can include a bearing surface for guiding and supporting one of the sides of the punch. A guide block, having a groove cut in one side thereof, can be positioned with the groove extending over the remaining three sides of the punch to define a guide channel with the bearing surface. Since the guide channel is formed around the punch, alignment is easily accomplished and maintained.

In this embodiment, a die may be located on the side of the sheet metal workpiece opposite to that of the guide structure so that the guide block may also perform a stripping function. The die may be connected to the guide structure by a narrow throat. It may have a similar guide channel cut therein for cooperation with the bearing surface which may extend through the throat. This latter guide channel also can perform an alignment function if the punch is provided with sufficient length to remain in the channel during the return stroke.

To align the punch and die, the punch can be set on the bearing surface and the guide block and die can be accurately positioned and fixed over the punch. Thus positioned, both the guide block and the die are automatically aligned with the punch during assembly of the apparatus. This alignment can be maintained even if the guide block or the die become loose.

In the first embodiment, the die member also functions as a guide block. In this embodiment, the die members also function as guide members. This embodiment is of particular advantage since the only structure extending beyond the sheet metal is the stripper. Since this stripper can be of minimal size, this embodiment is particularly useful in making interior cuts. Starting holes can be of minimal size and very sharp corners can be cut in the sheet metal. In this embodiment, portions of the second guide member define a chip discharge hole which also provides clearance for the punch.

These and other features and advantages of the invention will become more apparent with a description of preferred embodiments and reference to associated drawings.

DESCRIPTION OF THE DRAWINGS

FIG. 1 is a perspective view of a portable nibbler being used to make an interior cut in a piece of sheet metal;

FIG. 2 is a side elevational view of one embodiment of the nibbler illustrated in FIG. 1;

FIG. 3 is a front elevational view of the embodiment of a nibbler illustrated in FIG. 2;

FIG. 4 is a bottom plan view of the nibbler illustrated in FIG. 3 with the sheet metal removed;

DESCRIPTION OF PREFERRED EMBODIMENTS

Figure 6:
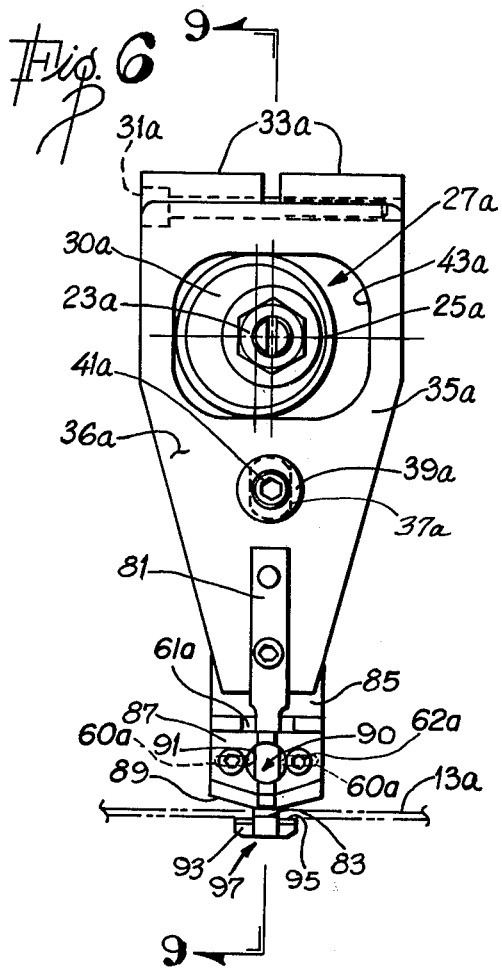
FIG. 6 is a front elevational view of the embodiment illustrated in FIG. 5.

A nibbler is illustrated in FIG. 1 and designated generally by the reference numeral 11. The nibbler 11 is adapted for use in cutting sheet metal or other workpiece material 13 by nibbling or otherwise shearing small chips from the workpiece 13 along a line 14. The nibbler 11 illustrated in FIG. 1 is particularly advantageous for use in making an interior cut in the workpiece 13. Such a cut is typically made by drilling a starting hole 15 and inserting a portion of the nibbler 11 into the starting hole 15 to begin cutting the line 14.

The nibbler 11 in this particular embodiment is portable and includes a housing 17 having a generally longitudinal configuration adapted to be held in the hand of the user. The housing 17 encloses a source of power such as an electric motor or a pneumatic motor (not shown). An operating switch or valve can be operated by a lever 19 which can be squeezed against the housing 17 to activate the nibbler 11.

An end plate 29 having bifurcated portions 33 extends generally perpendicular to the longitudinal dimension of the housing 17 at one end thereof. The plate 29 can be fixed to the housing 17 by any suitable means such as a screw 31 drawing the bifurcated portions 33 of the plate 29 snuggly against the housing 17.

In a preferred embodiment, a shaft 21, which extends from the housing 17 beyond the end plate 29, is provided with rotary motion by the source of power in the housing 17. Means is provided for converting this rotary motion to a reciprocating motion. This conversion means may include an eccentric shown generally at 27 and a drive plate 35 which is reciprocated relative to the end plate 29 in surface-to-surface abutment therewith by the eccentric 27. The drive plate 35, which has an outermost surface 36, may be provided with an oblong slot 37 and held in sliding engagement with the end plate 29 by a bushing 38, a washer 39, and a bolt 41 which extends through the slot 37.

Portions of the drive plate 35 define a relatively large opening 43 around the eccentric 27. In a preferred embodiment of the invention, the eccentric 27 includes a cylindrical member 30 which is fixed in nonconcentric relationship to the shaft 21 by a nut 23 and associated washer 25.

The opening 43 in the drive plate 35 of a preferred embodiment has a generally rectangular configuration and is defined by a pair of long sides separated by substantially the diameter of the cylindrical member 30. A pair of short sides of the opening 43 are separated by a distance sufficient to clear the eccentric 27. With these dimensions, the eccentric 27 will provide the drive plate 35 with reciprocating motion in the vertical direction in FIG. 3 without providing reciprocating motion in the horizontal direction in FIG. 3. Thus, the eccentric 27 and the drive plate 35 provide means for converting the rotary motion of the shaft 21 to reciprocating motion of the drive plate 35.

A punch 45 having a longitudinal configuration and a cutting edge 46 facing downwardly in FIG. 2, can be fixed to the drive plate 35 for reciprocation relative to the housing 17 between an extended position and a retracted position. The punch 45 can be aligned on the drive plate 35 in the direction of the reciprocation by any suitable means. In a particular embodiment, a pin 47 extends from the drive plate 35 into a hole in the punch 45 and a bolt 49 extends through a clearance bore in the punch 45 to engage a threaded hole in the drive plate 35.

Guide members 51 and 53, best illustrated in FIGS. 2 and 3 define a channel in which the punch 45 rides between the extended and retracted positions. The guide member 51 may be fixed to and aligned with the fixed plate 29 by a pin 55 and a pair of bolts 57. The pin 55 extends from the guide member 51 into a bore in the plate 29 while the screws 57 extend through clearance bores in the plate 29 to engage threaded bores in the guide member 51. The guide member 51 provides a bearing surface 59 which is substantially coplanar with the outermost surface 36 of the drive plate 35. The punch 45 has a surface-to-surface relationship with the bearing surface 59 and may be reciprocated relative thereto between its extended and retracted positions.

The guide member 51 may also be provided with a pair of stops 61 extending outwardly from the bearing surface 59 on either side of the preferred reciprocation path of punch 45. These stops 61 aid in the alignment of the guide block 53 and may have sufficient clearance to allow the punch to be positioned between them. The guide block 53 can be provided with a pair of clearance bores or slots 60 so that the block may be fixed to the guide member 51 by a pair of bolts 62 which extend through the clearance bores 60 to engage threaded bores in the guide member 51.

In this particular embodiment, a die member 65 may be disposed across a narrow gap from the guide block 53. A die support 63 may be connected to the guide member 51 by a narrow throat 67 and the die 65 connected to the support 63 by bolts 69. In this particular embodiment, the bolts 69 extend through clearance bores 70 in the die 65 to engage threaded bores in the support 63. The throat 67 and support 63 define an extension of the bearing surface 59; the extension thus also has a contiguous relationship with the punch 45. Portions of the support 63 extend beyond the bearing surface 59 on either side of the punch travel path to form a pair of stops 64 which contact the die member 65 in the assembled position to facilitate alignment of the support 63 and 65.

In this particular embodiment, the die 65 defines a cutting edge or surface 66 on the side of the sheet metal 13 opposite the housing 17. The cutting edge 46 of the punch 45 passes in close proximity to the cutting surface 66 of the die 65 as the punch 45 is moved to the extended position. Thus the action of the punch 45 punches or nibbles a multiplicity of chips from the workpiece 13 as the nibbler 11 is moved relative to it.

In the assembled state, the guide members 51 and 53 form the guide channel shown generally at 71 and the die 65 and support 63 form a guide channel shown generally at 73. In operation, the punch 45 reciprocates between the extended and the retracted positions within these channels 71 and 73. In a preferred embodiment, the punch 45 and the channels 71 and 73 are rectangular in cross section. This configuration is particularly desirable since it enables the nibbler 11 to cut square corners. Of course this configuration can also cut curved lines.

A feature of significant advantage to the present invention is the ease with which the alignment of the punch 45 and the channels 71 and 73 can be accomplished and maintained. Since the punch 45 reciprocates in contiguous relationship to the bearing surface 59, the guide block 53 and die 65 can be simply cut to form grooves or open slats 75 and 77, respectively, along the sides thereof which abut the bearing surface. The grooves 75 and 77 are preferably provided with a width and depth corresponding with the width and depth of the punch 45. These grooves 75 and 77 can be much more easily formed than can a rectangular hole in a single piece of die material.

With a punch 45 positioned on the outermost surface 36 of the drive plate 35, it will extend along the bearing surface 59 defined by the guide member 51, the throat 67, and the support 63. With the punch 45 thus disposed, the guide block 53 and die 65 can be positioned over the punch 45 and connected to the respective members 51 and 63 by the respective bolts 62 and 69. The clearance bores or slats 60 in the guide member 53 may be oblong extending in a lateral direction substantially perpendicular to the punch 45. This configuration enables the bolts 62 to fix the guide block 53 to the guide member 51 in laterally adjustable positions against the stops 61. Similarly, the bores 70 in the die 65 can be provided with an oblong configuration having an increased lateral dimension substantially perpendicular to the length of the punch 45. This configuration enables the bolts 69 to fix the die 65 to the die support 63 at laterally adjustable positions against the stops 64. With this provision for some lateral adjustability of the guide block 53 and the die 65, these members 53 and 65 can be positioned over the punch 45, and the bolts 54 and 69 can be tightened to thus align the punch 45 in the guide channels 71 and 73. Then, the punch may be fixed to the drive plate 35.

It will be noted in particular that when the guide members and die members are formed, the alignment of the grooves 75 and 77 in the respective members 53 and 65 is not absolutely critical. Rather, this alignment is accomplished upon attachment of the guide members 51 and 53 and the die members 63 and 65. It will be further noted that this alignment can be easily maintained since, in a preferred embodiment, a portion of the punch 45 remains in the channels 71 and 73 even when the punch 45 is in the retracted position. With this being the case, even if the guide member 53 and die member 65 become loose, the alignment of the punch 45 and channel 73 will be substantially maintained.

Another advantage of this particular construction is associated with the throat 67 which connects the guide support 51 and the die member 63. This throat 67 moves along the line 14 cut in the workpiece 13 by the punch 45. Since the forward surface of the throat 67 is maintained in contiguous relationship with the punch 45, relatively sharp curves can be cut with the nibbler 11. As noted, the throat 67 also provides an extension of the bearing surface 59 to support the punch 45.

In a further embodiment of the invention, elements having a like function are designated by the same reference numeral followed by a lower case *a*. Thus, the embodiment illustrated in FIGS. 5 through 7 includes a housing 1*a*, an eccentric 27*a*, and a drive plate 35*a* similar to those described in the previous embodiment. Similarly, many of those elements which have identical functions to those of the first embodiment will not be further described nor illustrated here since their description and illustration will only be redundant. In some cases, reference numerals have not been employed and the reader may assume that the structure is identical to that of the first embodiment in such instances. In the present embodiment, however, a punch 81 is provided with a cutting edge 83 which acts upwardly, as viewed in FIG. 5.

A guide member 85 is similar to the guide member 51 in that it defines a bearing surface 59*a* along and against which the punch 81 reciprocates. A die block 87 is similar to the guide block 53 in that it cooperates with stops 61*a* on the guide member 85 to provide alignment for the punch 81. However, in this particular embodiment, the die member 87 forms a cutting edge 89 which faces downwardly in FIG. 5 and away from the housing 17*a*.

Figure 5:
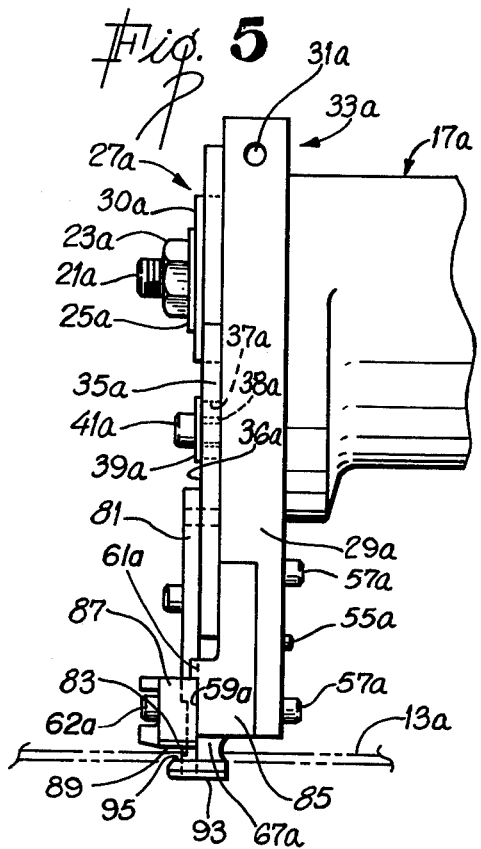
FIG. 5 is a side elevational view of a second embodiment of the nibbler illustrated in FIG. 1.
Figure 9:
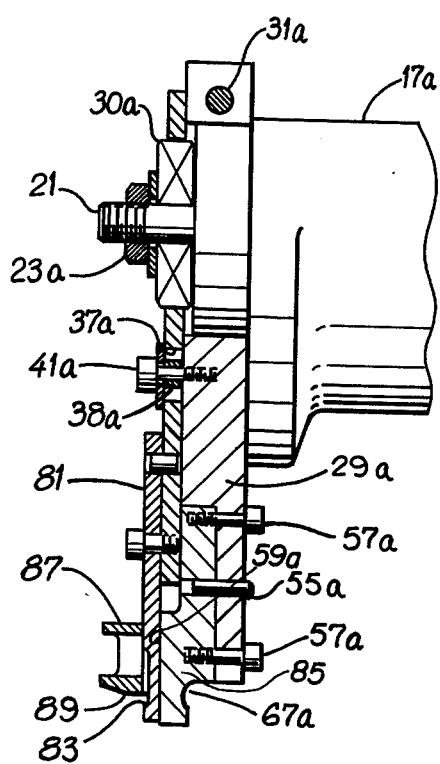
FIG. 9 is a cross-sectional view of the nibbler depicted in FIGS. 5-7, as seen along a line 9—9 in FIG. 6, with a portion of the stripper means removed therefrom for the sake of clarity.

As seen in FIGS. 5, 6, and 9, the die 87 includes an open groove or slot which is located against and cooperates with bearing surface 59*a* to form a channel 90 for alignment and containment of the punch 81 to limit its movement in any direction except that of vertical reciprocation.

In operation, the workpiece 13*a* is fed between the cutting edges 83 and 89 to punch or nibble chips from it during movement of the punch 81 from the extended position to the retracted position. Since the chips are cut during upward movement of the punch 81, in FIG. 5, they may tend to collect within the channel 90 formed between the die and guide member 87. For this reason, a chip discharge hole 91 may be formed to extend from the punch slot to the outer surface of the die 87 to enable the cut chips to be discharged substantially immediately after they are cut. The discharge hole 91 also provides clearance for the punch 81 to inhibit the binding thereof in proximity to the cutting edge 89.

It is of particular advantage that the cutting of the workpiece 13*a* is accomplished when the punch 81 is moving in the upward direction, toward the housing 17*a* in FIG. 5. This is desirable since the cutting force associated with this upward movement is made against a large section of the guide member 85 which reduces the bending and shear stresses developed in the cutting action.

Another feature of this embodiment of the invention is associated with the minimal structure which can be provided on the side of the workpiece opposite the housing 17. Since the die 87 and guide 85 are located on the same side of the workpiece 13 as the housing 17, no cutting structure need be provided on the opposite side of the sheet metal 13.

It may be desirable, however, to provide some means for stripping the severed material 13 from the punch 81 as it moves to the extended position. If this means is not provided, movement of the nibbler will force the workpiece against the punch 81 so that movement of the punch 81 to the extended position will also tend to move the sheet metal 13*a* away from the housing 17*a*.

Figure 7:
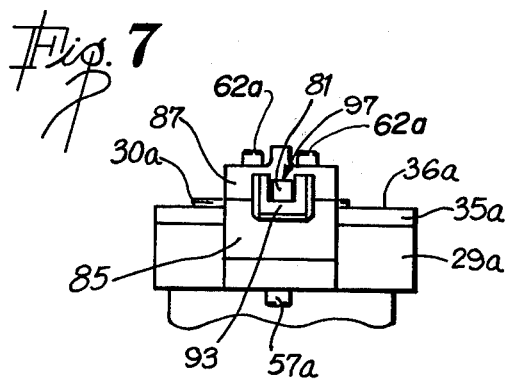
FIG. 7 is a bottom elevational view of the embodiment illustrated in FIG. 6.
Figure 8:
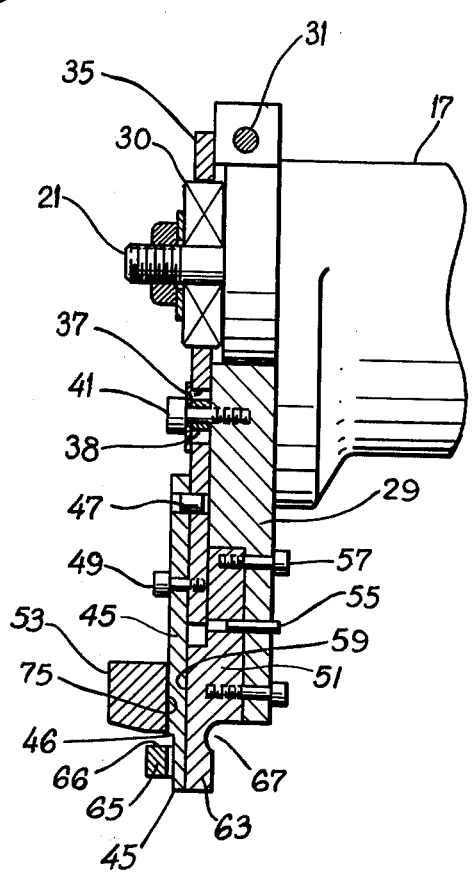
FIG. 8 is a cross-sectional view of the nibbler depicted in FIGS. 1-4, as seen along a line 8—8 in FIG. 3.

To oppose this movement, a small stripper 93 can be connected through a throat 67*a* to the guide member 85. This stripper 93 is disposed in close proximity to the punch 81 and form a stripping surface 95 which holds the sheet metal 13 in proximity to the cutting edge 89. In a particular embodiment, the stripper 93 can be provided with a groove 97 which is disposed to contact the sides and the back of the punch 81 as shown in FIG. 7. With this configuration, the stripper 93 also provides for control of lateral alignment of the punch 81. Furthermore, the throat 67a and the groove 97 provide an extension of the bearing surface 59a for supporting the punch 81 against bending as it is forced against the workpiece.

Since portions of the stripper 93 and portions of the punch 81 are the only elements of the nibbler 11 which extend beyond the cutting surface in this embodiment, and since these elements can be particularly small, it follows that the starting hole 15 can be of minimal size. This is particularly desirable if an interior cut is to be made. A small starting hole 15 will permit small interior holes to be cut.

Thus the nibbler of any embodiment of the present invention can be formed from parts which are easily machined and which can be assembled to easily provide and maintain alignment between a punch and an associated die channel. Furthermore, in accordance with the present invention this alignment is constantly maintained. In a particular embodiment, only a small stripper need be provided on the side of the workpiece opposite the cutting edge 89. This limited structure makes it possible to make very small interior cuts. A portable nibbler arranged for cutting on the upward stroke provides a significant reduction in the vibration associated with the reciprocating motion. Furthermore, the formation of punch guide channels having rectangular configurations facilitates use of the nibbler in cutting square corners. The rectangular die channels can be easily made in the manner discussed, since they need only be formed as open slots in elements which may be adjustably mounted against a bearing surface.

Although the invention has been described with reference to preferred embodiments, it will be apparent to those skilled in the art that the invention may be otherwise embodied. For example, the punch and die channel can have generally any cross-sectional configuration. It is preferable, however, that the punch have at least one flat side facilitating reciprocation of a punch, such as the punch 45, relative to a bearing surface, such as the surface 59. For this reason, the scope of the invention should be ascertained only with reference to the following claims.

I claim:
1. In a hand tool,
a housing including
 drive means therein,
first plate means fixedly attached to said housing and having
 means thereon forming a planar bearing surface of greater width than a punch means to be employed therewith and extending toward a work cutting location,
second plate means operatively connected to said drive means and operatively mounted for sliding surface-to-surface reciprocation relative to said first plate means,
punch means mounted on said second plate means for movement therewith and extending therefrom into surface-to-surface contact with said bearing surface for reciprocation relative thereto,
block means releasably fixed relative to said bearing surface having
 an open slot extending across one surface thereof, said open slot being located adjacent said bearing surface for defining a support and path of reciprocation for said punch means, and
means for laterally adjusting at least one of said punch and said block means relative to said bearing surface.

2. The tool of claim 1 including
cutting edge means on said punch means and
cooperative cutting edge means on said block means.

3. The tool of claim 1 including
second block means laterally adjustably fixed relative to said bearing surface and having
 an open slot extending across one surface thereof, said open slot being located adjacent said bearing surface for defining a second support and further delimiting the path of reciprocation for said punch means and
 means forming a cutting edge thereon, and
cutting edge means on said punch means for cooperation with said block cutting edge to cyclically sever a workpiece upon reciprocation of said punch.

4. A hand tool comprising
a housing,
drive means operatively mounted on said housing,
drive plate means operatively connected to said drive means for reciprocation thereof,
punch means mounted on said drive plate means, for reciprocation therewith, having
 cutting edge means thereon,
means fixed relative to said housing for forming a bearing surface located so that said punch means is positioned thereagainst for surface-to-surface relative reciprocation,
means for maintaining said punch means in a predetermined reciprocation path against said bearing surface means comprising
 block means having
  an open slot extending across one side thereof, and
  means for fixing said block means relative to said housing such that the one side thereof is positioned so that said slot is located against said bearing surface means and about said punch means to guide and maintain the latter against said bearing surface means, and
means for laterally adjusting the position of at least one of said punch means and said maintaining means relative to said bearing surface.

5. The hand tool of claim 4 wherein
said block means includes
 cutting edge means adjacent one end of said slot in cooperable relationship with said punch means cutting edge means for severing a workpiece.

6. The hand tool of claim 5 including
throat means, interconnecting said housing and said block means fixing means, for passage through the line of severance in a workpiece formed by said cutting edge means.

7. The hand tool of claim 4 wherein
said maintaining means includes
 second block means having
  an open slot extending across one side thereof and fixed similarly to but spaced from said first recited block means in the direction of reciprocation of said punch means, at least one of said block means including
  cutting edge means adjacent one end of the slot therein in cooperable relationship with said punch means cutting edge means for severing a workpiece.

8. The hand tool of claim 7 wherein said block means cutting edge means is located on the one of said block means which is most distant from said drive means and said block means cutting edge means and said punch means cutting edge means cooperate to sever a workpiece upon reciprocation of said punch means away from said drive means.

9. The hand tool of claim 8 including
narrow throat means intermediate said first recited and said second block means for passage thereof through a line of severance formed by said hand tool in a workpiece.

10. The hand tool of claim 5 including
stripper means fixed relative to said bearing surface in operative relationship with said bearing surface.

11. The hand tool of claim 10 including
throat means intermediate said block means and said stripper means which is narrow enough for passage thereof along a line of severance in a workpiece formed by said hand tool.

12. The hand tool of claim 5 wherein said block means cutting edge means is located on said block means for cooperation with said punch means cutting edge means to sever a workpiece upon reciprocation of said punch means toward said drive means.

13. The hand tool of claim 12 including
stripper means operatively fixed relative to the punch reciprocation path maintained by said block means, and means, interconnecting said maintaining means and said stripper means, for allowing passage of said hand tool along a line of severance in a workpiece, with said maintaining means on one side of the workpiece and said stripper means on the other.

* * * * *